United States Patent [19]

Geddie

[11] 4,217,857
[45] Aug. 19, 1980

[54] PET RELIEF STATION

[75] Inventor: Joseph D. Geddie, Norman, Okla.

[73] Assignee: M.H.G., Inc., Oklahoma City, Okla.

[21] Appl. No.: 898,723

[22] Filed: Apr. 24, 1978

[51] Int. Cl.³ .............................................. A01K 29/00
[52] U.S. Cl. ...................................................... 119/1
[58] Field of Search ..................... 119/1; 206/501, 503, 206/505, 514, 515, 516, 518, 519, 520; 220/4 C, 4 D, 23.6, 405, 406

[56] References Cited

U.S. PATENT DOCUMENTS

| 1,416,022 | 5/1922  | Hartley    | 119/15    |
| 2,530,124 | 11/1950 | Kieckhefer | 206/515 X |
| 2,765,772 | 10/1956 | Inman      | 119/48    |
| 2,963,003 | 12/1960 | Oberg et al. | 119/1   |
| 2,971,493 | 2/1961  | Robb       | 119/1     |
| 3,100,474 | 8/1963  | Schneider  | 119/1     |
| 3,141,441 | 7/1964  | Russell    | 119/1     |
| 3,233,588 | 2/1966  | Thomas     | 119/1     |
| 3,752,120 | 8/1973  | Pallesi    | 119/1     |
| 3,796,188 | 3/1974  | Bradstreet | 119/1     |
| 3,818,865 | 6/1974  | Sinclair   | 119/1     |
| 3,908,597 | 9/1975  | Taylor     | 119/1     |

Primary Examiner—Louis G. Mancene
Assistant Examiner—Robert P. Swiatek
Attorney, Agent, or Firm—Dunlap, Codding & McCarthy

[57] ABSTRACT

An improved pet relief station for the receiving of pet excrement, the relief station comprising a screen pan having a screen portion, and a pair of receiving pans that are alternatively stackable one in the other. The screen pan is placed in one of the receiving pans, and this pan is in turn stacked in the other receiving pan. Pet litter is disposed in the screen pan to cover the screen portion thereof. Once pet solids have been deposited on the pet litter, the solids are removed by lifting the screen pan, sifting the pet litter which separates the pet solids onto the screen portion, and disposing of the solids. Immediate reassembly of the relief station is afforded by separating the receiving pans, positioning the screen pan in the empty receiving pan, and then pouring the litter over the screen portion of the screen pan. The receiving pans are then restacked.

10 Claims, 5 Drawing Figures

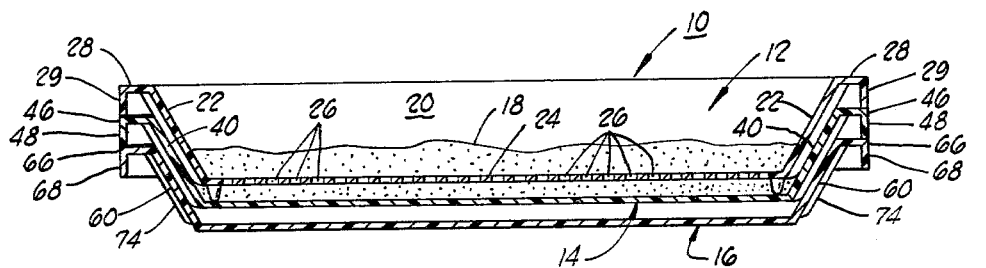
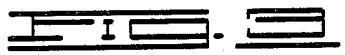
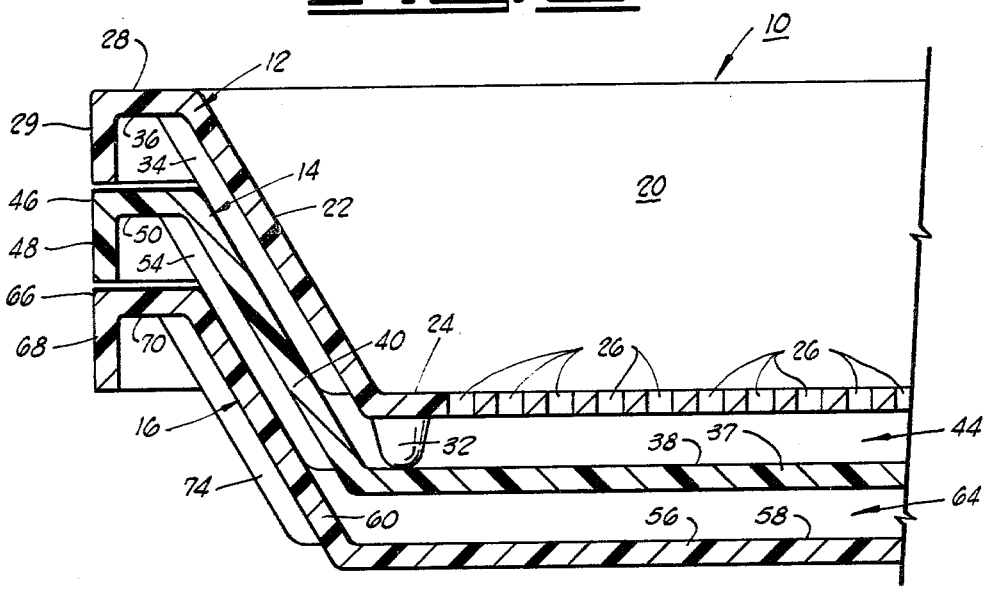
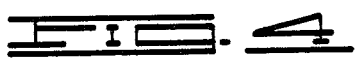
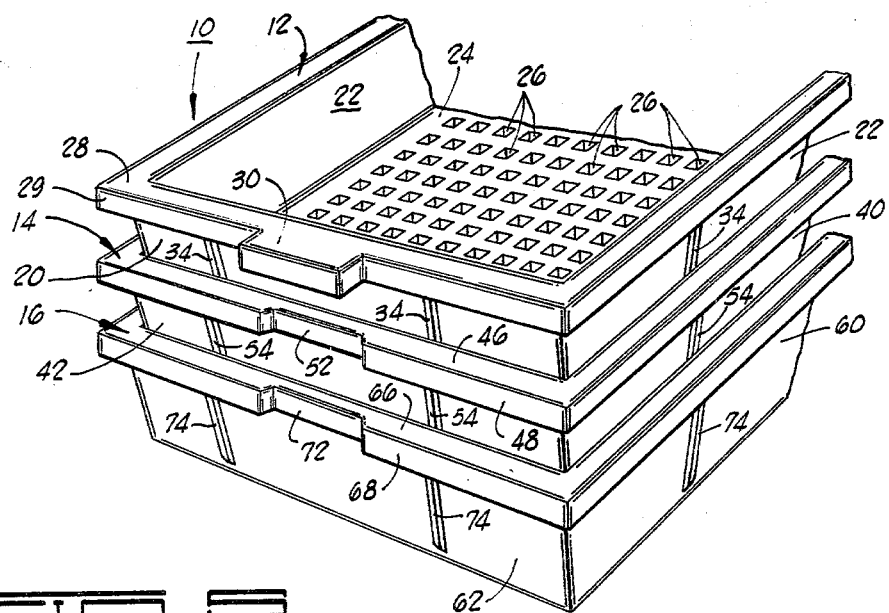
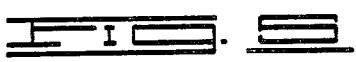

PET RELIEF STATION

BACKGROUND OF THE INVENTION

1. Field of Invention

The present invention relates generally to the field of animal care and facilities, and more particularly but not by way of limitation, to an improved pet relief station especially useful in the care of household pets.

2. Discussion of Prior Art

Throughout recorded history, man is the one animal that has had the capacity to view the earth and its creatures in a broad perspective. He has long believed that the world is more than just the human race—it is everything that exists everywhere and in all time. He has felt a kinship with everything that exists, and his special interest and affection has long been endowed upon all living creatures with whom he shares the mystery of life.

This affection is especially evident in man's gathering to himself and training of animals as pets for his care and affection. This process has been going on all down through recorded history. In recent times, especially in this country, household cats and dogs are present in such abundant numbers that substantially all of the population will at some time in their lives share a household with a beloved pet.

It is common experience that with one exception, most household pets live a well-trained, acceptable existance as a member of a household. That exception involves the special sanitary requirements that must be provided for the pets.

One approach to the sanitation needs of pets is the provision of a box with some form of litter contained therein, with the box placed in a fixed location in the household. In due time, most pets become trained to use the box as a relief station. While this serves to prevent random deposition of pet excrement in the house, cleanliness demands constant attention to keep the litter clean in order to eliminate odor and prevent sanitation problems. The cleaning of such relief stations is largely an unpleasant and often passed over task for most pet owners.

There have been some improvements offered by the prior art. For example, deodorizing chemicals have been developed helping to mask the odor generated by accumulations contained in a pet relief station, and improved litter material with highly absorbant characteristics have been developed. Also available are litter pans having holes for the passage of liquid urine to a tray disposed beneath the litter box; these have proven somewhat helpful to keep the litter dryer. However, this type of litter box does not help to dispose of the solid excrement, and the litter in most pet relief stations is rendered unusable as the pet solids quickly accumulate.

SUMMARY OF INVENTION

The present invention provides a pet relief station that makes the removal of solid pet excrement deposited on litter material a relatively easy and sanitary chore. A first receiving pan and a second receiving pan are provided for alternately holding a selected quantity of pet litter material. A screen pan having a screen portion is positioned in a selected one of the first or second receiving pans, and the selected receiving pan is stacked in the other receiving pan. Pet litter material is then disposed over the screen portion of the screen pan, the screen portion being positioned in near proximity to the bottom or litter supporting surface of the supporting one of the first or second receiving pans. The openings in the screen portion are selectively sized so as to freely pass the pet litter material, but the openings are small enough to retain substantially all pet solids deposited on the pet litter material.

This arrangement permits easy separation and collection of the pet solids for disposal by simply lifting the screen pan and sifting the pet litter material therethrough. Once the solids have been disposed, the screen pan is placed in the other one of the first or second receiving pans, and the litter material is poured therein so as to once again cover the screen portion. The receiving pans are then again stacked in reverse order.

It is an object of the present invention to provide an improved pet relief station which is easily and quickly cleaned of solid pet excrement.

Another object of the present invention is to provide an improved pet relief station which can be cleaned of solid pet excrement without handling or contacting the excrement.

Yet another object of the present invention is to provide an improved pet relief station which is well ventilated to maintain the litter in the relief station substantially dry and odor free, thereby extending the useful life of the litter.

A further object of the present invention is to provide an improved pet station that is inexpensive to manufacture, that is rugged, and that is easy to care for and to keep clean.

Other objects, features and advantages of the present invention will be apparent from the following detailed specification when read in conjunction with the drawings and appended claims.

BRIEF DESCRIPTION OF THE DRAWINGS

FIG. 3 is a cross sectional view taken at 3—3 in FIG. 2.

FIG. 4 is an enlarged view of one end of the view shown in FIG. 3.

FIG. 5 is a partial exploded view of the screen pan and receiving pans of the pet relief station of FIG. 1 shown in stacked relationship.

DESCRIPTION OF THE PREFERRED EMBODIMENT

Figure 1:
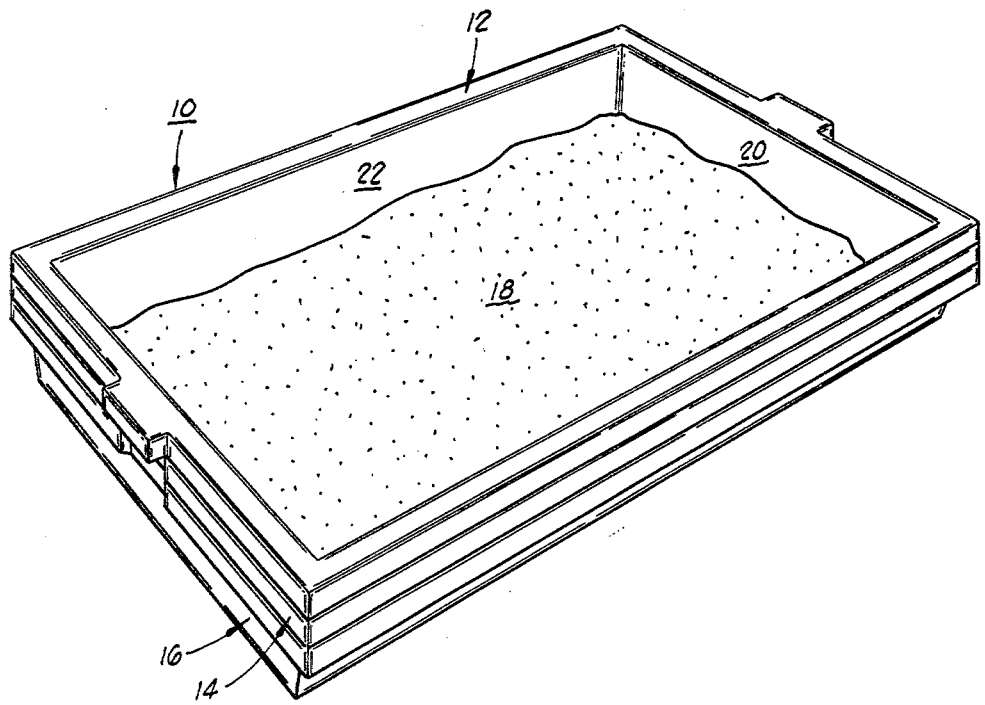
FIG. 1 is an isometric view of a pet relief station constructed in accordance with the present invention.

A pet relief station constructed in accordance with the present invention is shown in FIG. 1 and designated therein by the numeral 10. FIG. 1 shows a screen pan 12, a first receiving pan 14, and a second receiving pan 16 in assembled, stacked relationship to each other. A pet litter material 18 partially fills the screen pan 12.

While the present invention is not limited by the selection of the type of pet litter material utilized, there are a number of such materials readily available in this country which have excellent liquid absorbing characteristics. Such litter material may be simply treated sawdust, or may be manufactured material of various compositions and physical characteristics. Generally speaking, such litter material generally comprises granular material having a particle size less than about one quarter inch across. As will be discussed below, the screen pan is structured to readily pass most commercially available litter material compositions.

Figure 2:
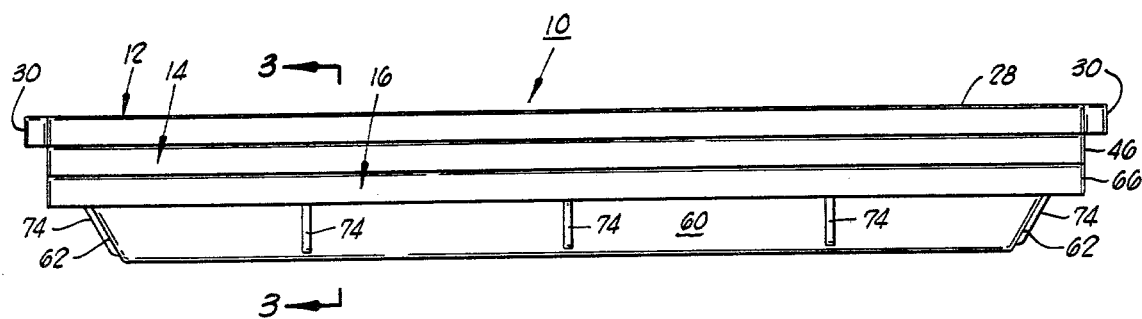
FIG. 2 is a side elevational view of the pet relief station shown in FIG. 1.

As viewed in the side elevational view of FIG. 2, and in the cross sectional view of FIG. 3 which is taken at 3—3 in FIG. 2, the screen pan 12 is stacked in the first receiving pan 14 and comprises opposing end walls 20 and opposing side walls 22 that extend upwardly at a selected slope from a pan bottom 24. A portion of the pan bottom 24 has a plurality of spaced apart openings 26 that form a screen. The size of the openings are selectively dimensioned to permit pet litter material to pass freely therethrough, and are dimensioned so as to prevent the passage of most pet solids. Openings of approximately one quarter inch to three eighths inch across are usually adequate to retain substantially all pet solid excrement while freely passing most types of pet litter material.

The screen pan 12 has a rim 28 with a downwardly extending lip 29 extending around the upper portions or brim of the walls 20, 22, and extending handle portions 30 are provided at each end. Also, a plurality of stand-off support members 32 extend externally from the pan bottom 24 and serve to elevate the screen pan 12 above a supporting surface. Finally, the screen pan 12 has several stand-off rib members 34 extending externally from the walls 20, 22 and projecting generally downwardly from the underside 36 of the rim 28; the ribs 34 are spaced apart along the sloped walls 20, 22 for a reason that will be made clear below.

The first receiving pan 14 has a pan bottom 37 that has a litter supporting surface 38 and upwardly extending side walls 40 and end walls 42 that cooperatively form a first container cavity 44. The slope of the walls 40, 42 of the first receiving pan 14 are established to be substantially equal to the slope of the walls 20, 22 of the screen pan 12, and the dimensions of the first receiving pan 14 and the screen pan 12 are established such that the latter mentioned screen pan is receivable in stacking relationship in the first container cavity 44 in a manner discussed more fully below.

The first receiving pan 14 has a rim 46 similar to the rim 28 described above for the screen pan 12, the rim 46 having a downwardly extending lip 48 and an underside 50. The rim 46 is generally continuous about the brim of the walls 40, 42 with the exception of a relief portion 52 located below each of the handles 30 of the screen pan 12 when the latter mentioned screen pan is stacked into the first receiving pan 14. This correspondence of the relief portions 52 to the handles 30 is depicted in the exploded view of FIG. 5.

The first receiving pan 14 also has several stand-off rib members 54 that extend externally from the walls 40, 42 and project generally downwardly from the underside 50 of the rim 46; the ribs 54 are positioned in spaced apart relationship along the walls 40, 42 and serve a purpose to be discussed below.

The second receiving pan 16 is constructed substantially identically to that described above for the first receiving pan 14. That is, the second receiving pan 16 has a pan bottom 56 that has a litter supporting surface 58, and upwardly extending side walls 60 and end walls 62 that cooperatively form a second container cavity 64. The slope of the walls 60, 62 are established to be substantially equal to the slope of the walls 20, 22 of the screen pan 12 and the walls 40, 42 of the first receiving pan 14. The dimensions of corresponding elements of the first and second receiving pans 14, 16 are established to be the same, and as pointed out above for the first receiving pan 14, the screen pan 12 is also receivable in stacking relationship in the second container cavity 64 of the second receiving pan 16 as more clearly described below.

The second receiving pan 16 has a rim 66 similar to the rim 46 described above, the rim 66 having a downwardly extending lip 68 and an underside 70. The rim 66 is generally continuous about the brim of the walls 60, 62 with the exception of a pair of relief portions 72 located in like manner to that described above for the relief portions 52 of the rim 46 of the first receiving pan 14, and as likewise shown in FIG. 5.

The second receiving pan 16 also has several stand-off rib members 74 extending externally from the walls 60, 62 and projecting generally downwardly from the underside 70 of the rim 66; the ribs 74 are positioned in spaced apart relationship along the walls 60, 62 for a purpose explained below.

The stacking relationship of the screen pan 12, the first receiving pan 14 and the second receiving pan 16 will now be described. As best depicted in FIGS. 3 and 4, the screen pan 12 is receivable in stacking relationship in either the first or second receiving pans 14, 16, and discussion will begin with the stacking order shown in the drawings. That is, the screen pan 12 is stacked in the first receiving pan 14 such that the walls 20, 22 are positioned respectively in near proximity to the walls 40, 42, with the several rib members 34 disposed therebetween. The rim 28 of the screen pan 12 resides just above the rim 46 of the first receiving pan 14, and the bottom or screen 24 of the screen pan 12 is positioned in near proximity to the litter supporting surface 38 of the first receiving pan 14. The stand-off support members 32 engage the litter supporting surface 38 and serve to support the screen 24 a predetermined distance above this surface; the wall ribs 34 also help to support the screen pan 12 at the proper position in the first container cavity 44.

When litter material is placed over the screen 24 of the screen pan 12, the litter will pass through the openings 26 to generally fill the space between the screen 24 and the litter supporting surface 38. It is recommended that sufficient litter be placed in the screen pan 12 to fill that space and to cover the screen 24 by a thickness of about a half inch or more. The walls of the screen pan 12 and the first receiving pan 14 are caused to be spaced apart by the rib members 34, and the spaces defined between the ribs 34 serve as air ventilating channels to provide for the aeration of the litter contained on the litter supporting surface 38. Relief slots (not shown) may be provided at intervals along the lip 29 of the rim 28 if necessary to provide better air communication to the air ventilation channels formed between the ribs 34.

It is recommended that the screen 24 of the screen pan 12 be disposed about three fourths of an inch above the litter supporting surface 38, and while the stand-off supporting members 32 are helpful in assuring that this separation is maintained, this can also be achieved by designing the rib members 34 with proper slope and thickness to permit the entry of the screen pan 12 only to a predetermined depth in the first container cavity 44. However, the use of the stand-off support members 32 provides some additional support to prevent the depression of the screen 24 by the weight of the pet on top of the litter material 18. It is known that pets will often dig down in the litter, and the positioning of the screen a determined distance above the litter supporting surface 38 assures that the excrement will not be deposited directly onto the litter supporting surface of the supporting receiving pan.

While the discussion above has considered the screen pan 12 as being stacked in the first receiving pan 14, the relationship of the screen pan 12 to the second receiving pan 16 is identical to that described when stacked in the latter mentioned receiving pan, as the first and second receiving pans 14 and 16 are interchangeable with each other. Furthermore, the first and second receiving pans 14 and 16 are stackable one to the other in the manner best depicted in FIGS. 3 and 4 in which the first receiving pan is stacked in the second receiving pan 16.

When so stacked, the first receiving pan 14 is supported such that its pan bottom 37 is disposed a small distance above the litter supporting surface 58 of the second receiving pan 16 via the ribs 54 extending from the walls of the first receiving pan 14. Air ventilating channels are defined between the ribs 54 that communicate with the space above the litter supporting surface 58 of the second receiving pan 16 so that this surface will be aerated to dry the surface as required should the surface have been wetted by pet urine when previously used to support the screen pan 12. Relief notches (not shown) may be provided along the overlapping lip 48 if better ventilation is required.

The same stacking characteristics would pertain when the second receiving pan 16 is stacked in the first receiving pan 14. In that profile, the pan bottom 56 of the second receiving pan 16 will be supported above the litter supporting surface 38 of the first receiving pan 14 via the ribs 74 along the walls of the second receiving pan 16. As before, the space above the litter supporting surface 38 will be open to ventilation by the air ventilation channels between the ribs 74, and relief slots (not shown) may be provided along the lip 68 as required.

In the use of the preferred embodiment constructed as described above, the first and second receiving pans 14 and 16 serve to form a receiving pan assembly for support of the screen pan 12. Initially, the screen pan 12 is positioned in the first receiving pan 14 and the litter material is placed over the screen 24 as described above. As the relief station 10 is used by a household pet, the pet solids will accumulate in the litter material 18, and the urine will be absorbed by the litter.

As may be desired, the pet relief station 10 can be refreshed as follows. Once a day, or as frequently as desired, the accumulated pet solids are removed in the following manner. The handles 30 may be easily grasped (as aided by the relief portions 52, 72 respectively of the rims 46, 66 as shown in FIG. 5) to lift the screen 24, whereupon the pet solids and some litter will be raised. By shaking the screen pan 12 gently above the litter matter 18, substantially all of the litter will be passed to the litter pile remaining in the first receiving pan 14 and the pet solids will be retained on top of the screen 24.

The screen 24 can then be cleaned as by dumping same in a selected disposal area, such as by using a water closet. On occasion, it may be that one will want to wash the screen 24, but usually the screen pan 12 is ready for immediate reuse following the step of simply dumping the pet solids therefrom.

Next the first receiving pan 14 is removed from the second receiving pan 16 and placed in a convenient standby location. Then the screen pan 12 is placed in the second receiving pan 16 which is empty at this point. Once the screen pan 12 is stacked into the second receiving pan 16, the litter material 18 is poured from the first receiving pan 14 over the screen 24 in the manner discussed above. Once the first receiving pan 14 has been emptied of its litter material, the first receiving pan 14 is placed on the support surface selected to hold the relief station 10, and the second receiving pan 16, containing the screen pan 12 and the litter material 18, is stacked in the first receiving pan 14, effectuating the reverse stacking relationship of the receiving pan assembly. As need arises to empty the relief station 10 of its solids, the above described procedure is simply repeated, reversing the stacking relationships of the receiving pans 14 and 16 during each emptying cycle.

It is recognized that the litter material 18 could be poured into a litter holding tray after the screen pan 12 has been removed from the receiving pan, that the screen pan 12 could then be returned to the empty receiving tray, and that the litter could then be transferred back to the receiving pan from the litter holding tray. However, this is not preferred, as an additional litter transferring step would be required when comparing such a method to the use of the preferred embodiment described herein.

It should be clear that the present invention is well adapted to carry out the objects and to obtain the ends and advantages mentioned herein, as well as to achieve those that are inherent therein. While a presently preferred embodiment of the invention has been described for purposes of this disclosure, numerous changes may be made which will readily suggest themselves to those skilled in the art and which are accomplished within the spirit of the invention disclosed and as defined in the appended claims.

What is claimed is:

1. An improved pet relief station for supporting pet litter material, the station comprising:

a first receiving pan having a bottom portion and upwardly extending side walls, the bottom portion and side walls cooperating to form a first container cavity;

a plurality of spatially disposed stand-off ribs extending outwardly from the side walls of the first receiving pan;

a second receiving pan having a bottom portion and upwardly extending side walls, the bottom portion and side walls cooperating to form a second container cavity, the second container cavity adapted to receive the first receiving pan such that in an assembled position the spatially disposed stand-off ribs of the first receiving pan engage the side walls of the second receiving pan to form substantially unobstructed air ventilating channels therebetween, the air ventilating channels communicating with the bottom portion of the second receiving pan, the stand-off ribs of the first receiving pan maintaining the bottom portion of the first receiving pan in a spatial relationship with the bottom portion of the second receiving pan;

a screen pan having a screen bottom portion and upwardly extending side walls, the screen bottom portion having a plurality of openings therein, the openings being sized to retain pet solids thereon while permitting the pet litter to pass therethrough; and a plurality of spatially disposed stand-off ribs extending outwardly from the side walls of the screen pan, the screen pan positionable within the first container cavity such that in an assembled position the spatially disposed stand-off ribs of the screen pan engage the side walls of the first receiving pan to form air ventilating channels therebetween, and the air ventilating channels communicating with the bottom portion of the first receiving pan, the stand-off ribs of the first receiving pan maintaining the screen bottom portion of the screen pan in a spatial relationship with the bottom portion of the first receiving pan.

2. The improved pet relief station of claim 1 wherein the screen pan further comprises:
support means depending from the screen bottom portion for supporting the screen pan a predetermined distance from the bottom portion of the first receiving pan.

3. The improved pet relief station of claim 1 wherein the screen pan further comprises:
handle means for lifting the screen pan from the first receiving pan and supporting the screen pan while sifting the pet litter therethrough.

4. The improved pet relief station of claim 1 wherein the first receiving pan and the second receiving pan are interchangable, one with the other, in a stacking relationship with the screen pan and wherein the first receiving pan, the second receiving pan and the screen pan each further comprise:
a rim member extending from an upper portion of the side walls thereof; and
handle means for lifting the pan, the handle means being formed by relief portions in a portion of the rim member disposed on opposed side walls of the pan such that when the first receiving pan and the second receiving pan are aligned in stacking relationship with the screen pan the handle means of each of the pans is aligned with the handle means of each adjacent pan so that the relief portions of each of the pans are accessible for hand gripping.

5. An improved pet relief station for supporting pet litter material, the station comprising:
a receiving pan having a litter supporting bottom portion and upwardly extending side walls, the bottom portion and side walls cooperating to form a container cavity;
a plurality of spatially disposed stand-off ribs extending outwardly from the side walls of the receiving pan;
a screen pan having a screen bottom portion and upwardly extending side walls, the screen bottom portion having a plurality of openings therein, the openings being sized to retain pet solids thereon while permitting the pet litter to pass therethrough; and
a plurality of spatially disposed stand-off ribs extending outwardly from the side walls of the screen pan, the screen pan positionable within the container cavity such that in an assembled position the spatially disposed stand-off ribs of the screen pan engage the side walls of the receiving pan to form substantially unobstructed air flow channels therebetween for providing air ventilation to the litter supporting bottom portion of the receiving pan, the stand-off ribs of the screen pan further cooperating with the side walls of the receiving pan to maintain the screen bottom portion of the screen pan in a spatial relationship with the bottom portion of the receiving pan.

6. The improved pet relief station of claim 5 wherein the screen pan further comprises:
support means depending from the screen bottom portion for supporting the screen pan a predetermined distance from the bottom portion of the receiving pan.

7. The improved pet relief station of claim 6 wherein the screen pan further comprises:
handle means for lifting the screen pan from the receiving pan and supporting the screen pan while sifting the pet litter therethrough.

8. The improved pet relief station of claim 5 wherein the screen pan further comprises:
a rim member extending from an upper portion of the side walls thereof; and
handle means formed by a portion of the rim member for lifting the screen pan.

9. The improved pet relief station of claim 8 wherein the receiving pan further comprises:
a rim member extending from an upper portion of the side walls thereof; and
handle means formed by a portion of the rim member for lifting the receiving pan.

10. The improved pet relief station of claim 9 wherein:
the handle means of the screen pan are formed by relief portions in a portion of the rim member disposed on opposed side walls of the screen pan; and
the handle means of the receiving pan are formed by relief portions in a portion of the rim member disposed on opposed side walls of the receiving pan such that when the screen pan and the receiving pan are aligned in stacking relation the handle means of the screen pan and the receiving pan are accessible for hand gripping.

* * * * *